United States Patent [19]
Boekhorst

[11] 4,276,586
[45] Jun. 30, 1981

[54] TUNED SWITCHED-MODE POWER SUPPLY
[75] Inventor: Antonius Boekhorst, Eindhoven, Netherlands
[73] Assignee: U.S. Philips Corporation, New York, N.Y.
[21] Appl. No.: 23,110
[22] Filed: Mar. 23, 1979
[30] Foreign Application Priority Data
  Apr. 6, 1978 [NL] Netherlands ............ 7803661
[51] Int. Cl.³ .................................. H02M 3/335
[52] U.S. Cl. ............................. 363/21; 363/41; 363/97; 323/288
[58] Field of Search ............... 363/20–21, 363/26, 41, 97, 131; 323/17, DIG. 1
[56] References Cited
  U.S. PATENT DOCUMENTS
  3,819,992  6/1974  Opal et al. ............. 363/41 X
  4,031,453  6/1977  Teuling .................. 363/20
  4,037,271  7/1977  Keller ................... 363/21
  4,079,294  3/1978  Teuling .............. 363/21 X
  4,087,850  5/1978  Kolzumi ................. 363/21

Primary Examiner—William M. Shoop
Assistant Examiner—Peter S. Wong
Attorney, Agent, or Firm—Thomas A. Briody; William J. Streeter; Bernard Franzblau

[57] ABSTRACT

A tuned switched-mode power supply for producing a stabilized d.c. output voltage by controlling the duration of the conducting period of a bidirectional switch as a function of the output voltage. The drive switching pulses for the switch are subjected to a pulse duration modulation control followed by a frequency control in such a way that the switch-off pulses have a substantially pre-determined time duration which is longer than half a cycle of the tuning frequency of the power supply.

14 Claims, 3 Drawing Figures

TUNED SWITCHED-MODE POWER SUPPLY

The invention relates to a switched-mode power supply for converting a d.c. input voltage into a d.c. output voltage which is substantially independent of variations in the input voltage and/or of variations in a load connected to terminals for the output voltage. This type of power supply comprises the series arrangement of an inductance and a bidirectional controllable switch connected to input terminals for receiving the input voltage, a tuning capacitor arranged in parallel with said inductance, a drive or control circuit providing switching pulses for driving the switch alternately into the conducting and the cut-off states, the duration of the conducting state of the switch being controllable in dependence upon the output voltage, and a rectifier for supplying the output voltage by rectification of oscillations produced during periods when the switch is cut-off.

In such a tuned switched-mode power supply there is produced across the inductance, during the time interval in which the switch is cut-off, a substantially sinusoidal oscillation of a large amplitude whose frequency is determined by the value of the inductance and by the capacitance of the capacitor. After completion of half a cycle of this oscillation the switch conducts again causing the energy to be fed back to the input voltage source. This is the known efficiency principle. The tuning prevents the occurrence of an excessively high voltage across the switch during the cutoff period and prevents ringing with the parasitic capacitances which might cause an unwanted radiation.

In non-tuned switched-mode power supplies the output voltage is kept substantially constant because the duration of the conduction state of the switch is controlled in dependence upon the output voltage. This is usually effected by means of pulse-duration modulation of the drive pulses applied to the switch, these pulses having a frequency which is either constant or not constant. However, for tuned switched-mode power supplies the frequency of the switching pulses cannot be constant unless the value of the inductance or the capacitance of the tuning capacitor is controllable so that the tuning frequency, and consequently the duration of the above-mentioned oscillation, also are controllable. As control of the tuning frequency can only be realised with great difficulty and by means of comparatively expensive components, for example a transductor, a fixed tuning frequency is usually opted for in practice, which implies that the stabilisation can only be effected by means of a frequency control of the drive pulses and, consequently, of the oscillator producing these pulses.

It will, however, be apparent that while the duration of the sinusoidal oscillation is substantially constant at a fixed tuning frequency the duration of the switch-off drive pulses of the switch is generally not constant. A variable frequency of these pulses implies that the ratio between said duration and the period of time between two consecutive cut-off pulses varies little, as appears in practice. The result is that it may happen that the switch is made conductive before the oscillation has been completed, that is to say at an instant at which the voltage across the switch is not zero, which causes a large dissipation therein and possible damage thereto. Protection circuits have been proposed to ensure that such an untimely conduction of the switch is prevented, for example by ensuring that said ratio cannot assume certain values. This, however, has the consequence that when such a protection circuit operates the control does not work properly.

It is an object of the invention to provide a circuit of the above-defined type wherein the frequency control can be done in a satisfactory manner, while the switch cannot be made conductive as long as the oscillation has not been completed. To this end the switched-mode power supply according to the invention is characterized in operation by a pulse duration modulation control of the drive switching pulses, followed by a control of the frequency thereof. This frequency control is effected via a delay network by means of a control signal obtained from the pulse duration modulation control, the duration of the switch-off pulses having a substantially pre-determined duration which is longer than half a cycle of the resonant frequency of the resonant circuit constituted by the inductance and the tuning capacitor.

The invention provides the advantage that an existing circuit, for example one integrated in a semiconductor body, for performing a pulse-duration modulation control for non-tuned switched-mode power supplies becomes suitable in a very simple and inexpensive manner for a tuned switched-mode power supply.

The invention will be further explained by way of non-limitative example with reference to the accompanying drawing, wherein.

Figure 1:
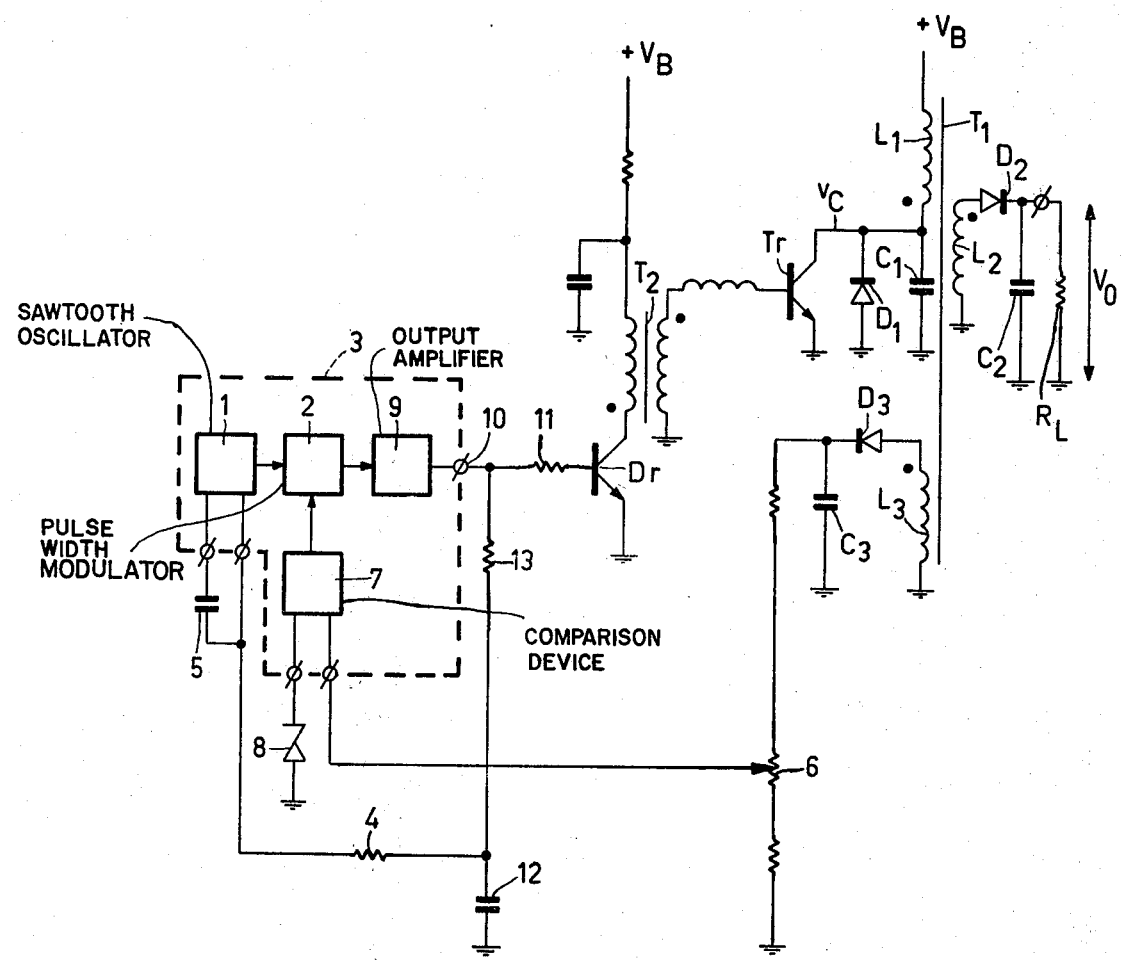
FIG. 1 shows an embodiment of a power supply according to the invention.

In FIG. 1 an npn-switching transistor Tr has a collector connected through the primary winding $L_1$ of a transformer $T_1$ to the positive terminal of a source which supplies a d.c. voltage $V_B$. The emitter of transistor Tr as well as the negative terminal of the DC voltage source (not shown) are connected to ground. Voltage $V_B$ is derived, for example, by means of a rectifying and smoothing circuit, from the AC electric supply.

A diode $D_1$ and a tuning capacitor $C_1$ are arranged in parallel with the collector-emitter path of transistor Tr. A secondary winding $L_2$ of transformer $T_1$ is connected on the one hand to the anode of a diode $D_2$ and on the other hand to ground. In FIG. 1 the winding sense of windings $L_1$ and $L_2$ are indicated by means of polarity dots. The cathode of diode $D_2$ constitutes an output terminal of the circuit of FIG. 1, a smoothing capacitor $C_2$ and a load $R_L$ being connected thereto. Load $R_L$ may be considered to be a resistor, the other connection thereof as well as the other connection of capacitor $C_2$ being connected to ground. During operation a d.c. voltage $V_o$ can, by means of a control still to be described, be made substantially independent, for example constant, of variations in voltage $V_B$ and/or in the load $R_L$. The core of transformer $T_1$ may be provided with additional secondary windings, not shown, by means of which other stabilised d.c. voltages can be obtained in a similar manner to that of voltage $V_o$. The d.c. voltage generated at the secondary side of transformer $T_1$ can supply energy to various sections of a device, not shown, for example a television receiver, whereby transformer $T_1$ can provide d.c. isolation between the section connected to the electric supply and the remaining sections of the device.

In operation drive pulses are applied to the base of transistor Tr, in a manner still to be explained, which set this transistor alternately to the conducting and to the cut-off state. FIG. 2a shows the (idealised) variation of these pulses versus time, while FIG. 2b shows the variation of the current $i_s$ which flows through the bidirectional switch consisting of transistor Tr and diode $D_1$ and FIG. 2c shows the variation of the voltage $v_c$ at the collector of transistor Tr.

At an instant $t_o$ a negative edge occurs in the switching signal which is applied to the base of transistor Tr. Transistor Tr, which was heavily saturated prior to instant $t_o$, is not cut-off until a later instant $t_1$. Capacitor $C_1$ which was short-circuited prior to instant $t_1$ by the collector-emitter path of transistor Tr constitutes a resonant circuit with winding $L_1$. Voltage $v_c$ which was substantially zero, now increases in accordance with a substantially sinusoidal variation and attains a maximum value at an instant $t_2$, whereafter it decreases. At an instant $t_3$ the voltage $v_c$ is again zero causing diode $D_1$ to become conductive. Between the instants $t_1$ and $t_2$ current flows from winding $L_1$ to capacitor $C_1$ and between the instants $t_2$ and $t_3$ current flows in the reverse direction. After instant $t_3$ current $i_s$ flows back via diode $D_1$ and winding $L_1$ to source $V_B$. As the voltage across the diode is negligible, voltage $V_B$ appears across winding $L_1$ so that the variation of current $i_s$ is substantially linear.

At an instant $t_4$ a positive edge occurs in the drive signal for transistor Tr which causes the transistor to become conductive. As the voltage at the collector of a transistor which is driven to saturation is lower than the voltage across a conducting diode, current $i_s$ now flows through the collector-base diode of transistor Tr, while diode $D_1$ is cut-off. At an instant $t_5$ current $i_s$ reverses its direction so that it now flows from $V_B$ through winding $L_1$ and the collector-emitter path of transistor Tr, until an instant $t'_1$, at which instant the collector current becomes zero in response to a negative edge occurring at the base of transistor Tr at a prior instant $t'_o$.

The time interval between the instants $t_3$ and $t_5$ is shorter than the time interval between the instants $t_5$ and $t'_1$, which means that the current $i_s$ has a direct current component which is determined by the losses in the circuit and by the various loads. Across secondary winding $L_2$ a voltage appears which is of the same shape as voltage $v_c$ and which is rectified by diode $D_2$ to obtain the voltage $V_o$, diode $D_2$ conducting just prior to and after instant $t_2$.

The average value of voltage $v_c$ is equal to voltage $V_B$ so that the maximum amplitude is much higher than voltage $V_B$, namely by a factor which depends on the ratio of interval $t_1$ to $t_3$ to interval $t_1$ to $t'_1$. It is obvious that the interval $t_1$ to $t_4$ in which transistor Tr is cutoff must exceed interval $t_1$ to $t_3$ wherein the sinusoidal oscillation is present at the collector of the transistor. Otherwise the transistor would be made conductive at an instant at which a considerable voltage is present at its collector, which would result in a large dissipation and, possibly, damage. In accordance with the invention, the circuit of FIG. 1 also comprises a control circuit which ensures that instant $t_4$ cannot occur before instant $t_3$ in spite of variations in the frequency of the switching signal.

A sawtooth oscillator 1 produces a sawtooth voltage which is applied to a pulse-duration modulator 2. Oscillator 1 and modulator 2 are part of an integrated circuit 3, for example the circuit of the Philips type TDA 2640 described in the publication "Philips Technical Information 002: TDA 2640 control module for switched-mode power supplies" of Sept. 25, 1975. Circuit 3 is shown in FIG. 1 by means of dotted lines. Oscillator 1 is a so-called Miller integrator whose frequency is co-determined by the value of a resistor 4 and the capacitance of a capacitor 5, both connected outside of circuit 3.

Figure 3:
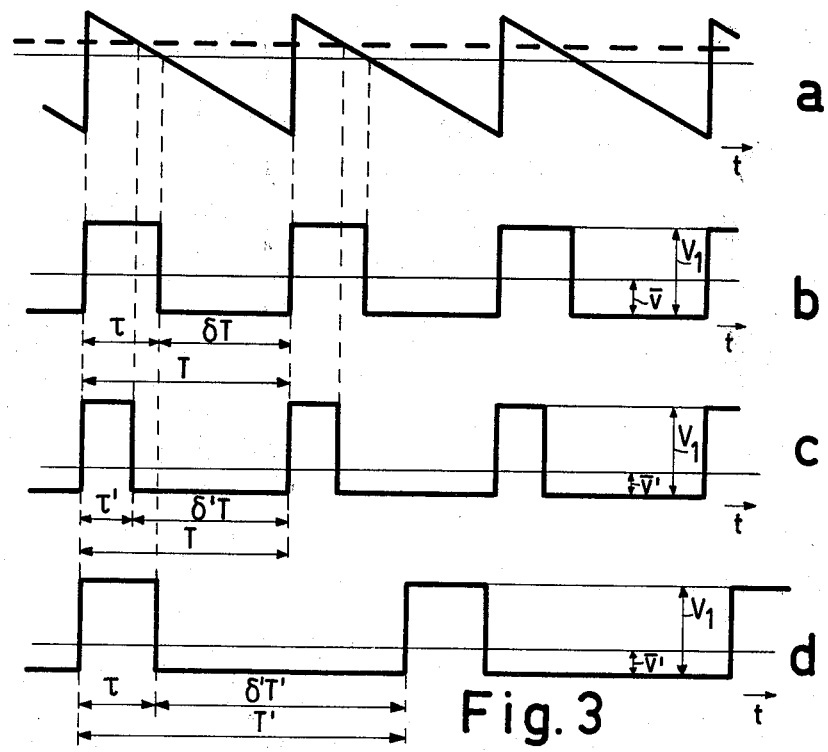
FIG. 3 shows waveforms occurring in the control circuit.

The sinusoidal voltage present across a secondary winding $L_3$ of transformer $T_1$ is converted into a d.c. voltage by means of a diode $D_3$ and a smoothing capacitor $C_3$. This d.c. voltage is proportional to the voltage $V_o$ and a portion of which, adjustable by means of a potentiometer 6, is supplied to a comparison stage 7. Stage 7 also forms a part of circuit 3. The measuring voltage received from capacitor $C_3$ is compared in comparison device 7 with a reference voltage which is obtained, for example, by means of a Zener diode 8. The output signal of stage 7 is a d.c. voltage the value of which is a function of the difference between the two input voltages thereof. FIG. 3a shows the variation of both input voltages of modulator 2 versus time. The output voltage thereof is pulse-shaped, the pulse duration depending on the output voltage of stage 7. This pulse shaped voltage is applied to an output amplifier 9. An amplified and phase-inverted pulse waveform, shown in FIG. 3b, is available at the output terminal 10 thereof, which is also the output terminal of circuit 3.

The output signal of circuit 3 is applied through a base resistor 11 to the base of a driver transistor Dr of the npn-type, which amplifies the signal and applies it to the base of switching transistor Tr through a driver transformer $T_2$. Circuit 3 comprises other circuits, inter alia for providing protection from excessive output voltages of the power supply, which are not described here because they are outside the scope of the invention. The supply voltage for the various portions of circuit 3 are derived from a secondary winding (not shown) of transformer $T_1$ and is, consequently, constant so that the amplitude of the pulse-shaped voltage present at terminal 10 is also constant. Circuits are known by means of which the various portions of the circuit of FIG. 1 can begin to operate when the apparatus is switched on or after a protection circuit has become operative, i.e. when the switched-mode power supply has not yet begun operating normally.

Figure 2:
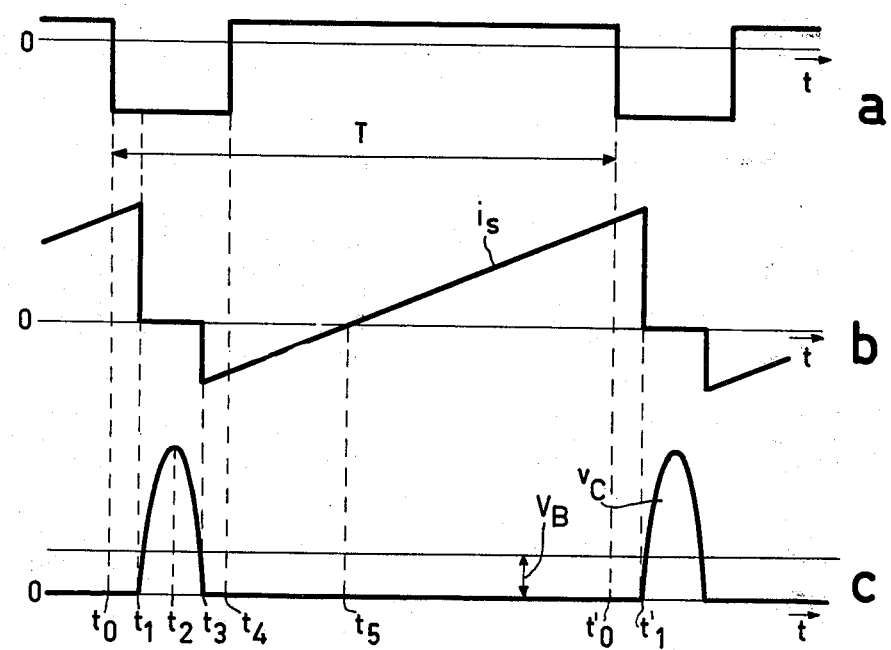
FIG. 2 shows waveforms occurring therein.

Resistor 4 is connected to a d.c. voltage which may, for example, be generated within circuit 3. In FIG. 1 this is the voltage present across a capacitor 12, which capacitor is outside the circuit 3. If the voltage across capacitor 12 is first assumed to be constant, the frequency of the sawtooth generated by oscillator 1 and, consequently, the frequency of the signals of FIG. 2, is also constant. With a certain value of voltage $V_B$, the ratio $\delta$ of the duration $t_4'-t_o$ of the switching pulse, supplied across the secondary winding of transformer $T_2$ and to transistor Tr, to the duration $T=t'_o-t_o$ of a period thereof has a certain value. If, for example, voltage $V_B$ decreases, voltage $V_o$ initially also decreases owing to the inertia of the control. This causes the output voltage of comparison stage 7 to increase, which is shown in FIG. 3a by means of dashed lines. As the polarity of the switching signal (FIG. 2a) applied to transistor Tr is inverted relative to the polarity of the signal of FIG. 3b, owing to the winding sense chosen for the windings of driver transformer $T_2$, it appears from this figure that the ratio $\delta$ increases. However, this variation does not affect voltage $V_o$ because current $i_s$ can flow through $D_1$ if transistor Tr is cut-off. It is a condition, however, that transistor Tr be turned on not later than a short period of time before instant $t_5$.

So, contrary to the known circuits, the described pulse duration modulation does not function to stabilise the output voltage. This modulation varies the position of one of the edges of the pulse in FIG. 3b along the time axis while the other edge occurs periodically. In order to be able to control the voltage $V_o$, the frequency of the sawtooth generated by oscillator 1 and, consequently, the voltage across capacitor 12 must not be constant, but must be controlled, whereby it be a requirement that the turn-on instant $t_4$ of transistor Tr is located between instants $t_3$ and $t_5$. In the circuit according to the invention, a substantially constant interval $t_o$ to $t_4$ is opted for, which is certainly longer than the half cycle $t_1$ to $t_3$ of the oscillation of the resonant circuit constituted by elements $L_1$ and $C_1$ and whereby the turn-off delay $t_o$ to $t_1$ of transistor Tr is taken into account.

In order to achieve this object, a resistor 13 is provided in FIG. 1 between terminal 10 and the non-grounded terminal of capacitor 12. With a suitable dimensioning of the time constant of network 12, 13 the average value $\bar{v}$ of the voltage present at terminal 10 appears across capacitor 12. From FIG. 3b it will be seen that $\bar{v} = (1-\delta) V_1$, where $V_1$ is the amplitude of said voltage.

Owing to the operation of the pulse duration modulation already described ratio $\delta$ assumes, for example, a higher value $\delta'$ while the frequency does not vary, so that the turn-off pulse has a shorter duration $\tau'$ than its duration $\tau$ in FIG. 3b. As a consequence the average value of the voltage at the terminal 10 becomes lower, namely $\bar{v} = (1-\delta') V_1$ wherein $V_1$ has stayed constant. FIG. 3c shows the new situation.

As the voltage across capacitor 12 is lower, the frequency of the waveform generated by oscillator 1 decreases while the ratio $\delta$ is not affected thereby and, consequently, retains the value $\delta'$. As it only depends on $\delta$, voltage $\bar{v}$ does not vary either and retains the value $\bar{v}'$. At the new frequency $f' = 1/T$, the turn-off pulse has a duration of $\tau''$. FIG. 3b shows that between the magnitudes $\tau$, being the duration of the turn-off pulse, and $f = 1/T$, being the frequency, there is the relation $$\tau = (1-\delta)T = \frac{1-\delta}{f},$$

from which it follows that $$\tau = \frac{\bar{v}}{fV_1}.$$

From the preceding it follows that $$\tau' = \frac{1-\delta'}{f} = \frac{\bar{v}}{fV_1}$$

and that $$\tau'' = \frac{1-\delta'}{f'} = \frac{\bar{v}}{f'V_1}.$$

So the described frequency control furnishes a pulse duration which is proportional to the ratio $\bar{v}/f$. As oscillator 1 is of the Miller integrator type, the frequency of the signal generated thereby is proportional to the voltage to which the charging or discharging resistor 4 for capacitor 5 is connected, i.e. to the voltage across capacitor 12. So it is an oscillator for which the above-mentioned ratio is constant. Thus it follows that $\tau'' = \tau$ (see FIG. 3d). So we may say that the pulse duration of the turn-off pulse is kept substantially at the pre-determined value $\tau$ owing to the frequency control.

If in the circuit of FIG. 1 a variation in voltage $V_o$ occurs, then the pulse duration modulation control is first made operative, which is effected with a delay caused by capacitors $C_2$ and $C_3$. Owing to the delay caused by capacitor 12 the frequency control does not become effective until after the pulse duration control. As the new value of ratio $\delta$, obtained by the first control, is an indication of the new frequency to be obtained by the second control, the controls must indeed be effected in this sequence. During the frequency variation the interval $t_o$ to $t_4$ remains substantially constant. From FIG. 3d it will be seen that for the above-mentioned case of a decreasing voltage $V_o$ the conduction time of transistor Tr increases and assumes a value $\delta'\tau'$. As this causes an increased energy storage in inductance $L_1$, this variation counteracts the variation of voltage $V_o$, which is the desired situation. For an increase in voltage $V_o$ the conduction time of transistor Tr decreases while the frequency of the switching signal increases.

It is obvious that the frequency control should not be too slow relative to the pulse duration modulation control because then there would be the risk that the falling edge of the pulse of FIG. 3c would be located within interval $t_1$ to $t_3$, while in certain circumstances an equilibrium situation could not be achieved. For this the value of the time constant of the network constituted by elements 12 and 13 and, on the other hand, the values of resistors 4 and 13 are important. In practice it appeared that a satisfactory result could be obtained with values of approximately 47 k$\Omega$ and 27 k$\Omega$ for resistors 4 and 13, respectively, and a capacitance of approximately 22 nF for capacitor 12, while capacitor 5 had a capacitance of approximately 1.5 nF, the frequency varying from approximately 18 to approximately 35 kHz and amplitude $V_1$ being approximately 12 V.

It will be noted that the described tuned switched-mode power supply supplies a control by means of an integrated circuit 3 designed for a duration modulation control intended for non-tuned switched-mode power supplies in which the switching frequency is substantially constant, for example synchronisable. Thanks to the invention this circuit is made suitable for the frequency control required because of the tuning and at the additional cost of only resistor 13 and capacitor 12. It is not necessary that oscillator 1 be of the Miller integrator type, i.e. a sawtooth oscillator wherein a capacitor is charged and discharged, respectively, by a substantially constant current, which current is directly proportional to a voltage, and wherein the amplitude of the generator sawtooth is substantially constant. Other voltage-controlled oscillators wherein the frequency of the generated signal is proportional to an applied voltage are also suitable for use according to the invention.

What is claimed is:

1. A switched-mode power supply for converting a d.c. input voltage into a d.c. output voltage which is substantially independent of variations in the input voltage and/or of variations of a load connected to output terminals of the power supply, said power supply comprising the series arrangement of an inductance and a controllable switch connected to input terminals for receiving the input voltage, a tuning capacitor connected in parallel with said inductance to form a resonant circuit, a control circuit having an output for providing drive switching pulses for alternately driving the switch into the conducting and the cut-off states with the duration of the conducting state of the switch being controllable in dependence upon the output voltage, and a rectifier coupled to the resonant circuit and to the output terminals for supplying the output voltage by rectification of oscillations produced during periods when the switch is cut off, the control circuit including means providing a pulse duration modulation control of the drive switching pulses followed by a control of the frequency thereof with the frequency control effected via a delay network by means of a control signal obtained from the pulse duration modulation control, the duration of the switch-off pulses having substantially a pre-determined duration which is longer than half a cycle of the resonant frequency of the resonant circuit.

2. A power supply as claimed in claim 1 further comprising means responsive to a pulse shaped output voltage of constant amplitude produced by the control circuit for deriving said control signal which is equal to the average value of the pulse-shaped output voltage of the control circuit.

3. A power supply as claimed in claim 1 further comprising means for reversing the polarity of the drive switching pulses applied to the switch relative to the polarity of the pulse-shaped output voltage of the control circuit.

4. A power supply as claimed in claim 2 or 3 wherein the control circuit comprises a sawtooth generator, a comparison stage for comparing the output voltage with a reference voltage and for producing a d.c. voltage, and means coupled to the sawtooth generator and the comparison stage for converting a sawtooth signal generated by the sawtooth generator into a pulse shaped waveform, the sawtooth generator comprising a voltage-controlled oscillator for generating a signal whose frequency is proportional to an applied voltage which is the average value of the output voltage of the control circuit.

5. A power supply as claimed in claim 4 further comprising the series arrangement of a resistor and a capacitor connected to an output terminal of the control circuit, the voltage developed across said capacitor being the voltage applied to the sawtooth generator.

6. A power supply as claimed in claim 5 wherein said oscillator includes a capacitor which determines the frequency thereof, the power supply further comprising a second resistor for charging or discharging said capacitor, and means connecting the second resistor to the capacitor of said series arrangement.

7. A switched-mode power supply for converting an input voltage into a DC output voltage substantially independent of variations in the input voltage or variations in a load supplied thereby comprising, an input terminal for the input voltage and an output terminal for supplying the DC output voltage to a load, an inductor, a tuning capacitor, a controlled switch having a control electrode, means coupling the inductor to the tuning capacitor to form a resonant circuit tuned to a given resonant frequency, means coupling the resonant circuit to the input terminal and to the switch so that an oscillation signal is produced in the resonant circuit during a cut-off period of the switch, means coupled between the resonant circuit and the DC output terminal for converting said oscillation signal into said DC output voltage, a control circuit having an output terminal coupled to the switch control electrode for supplying switching pulses thereto for alternately driving the switch into a conductive and a cut-off state and with the switch-off pulses having a predetermined duration longer than a half cycle of the resonant frequency of the resonant circuit, said control circuit comprising a pulse-width modulator for supplying said switching pulses to the output terminal of the control circuit and input means responsive to a voltage determined by the output voltage for controlling the duration of the switching pulses as a function of said output voltage, and a time delay network coupling the control circuit output terminal to the control circuit input means for supplying thereto a delayed control voltage that varies the frequency of the switching pulses produced by the control circuit so as to keep the DC output voltage substantially independent of variations in the input voltage or the load.

8. A power supply as claimed in claim 7 wherein said control circuit further comprises a voltage-controlled oscillator responsive to the delayed control voltage at the control circuit input means to generate a signal whose frequency is proportional to said control voltage, and means coupling the oscillator signal to an input of the pulse-width modulator to control the frequency of the switching pulses produced therein.

9. A power supply as claimed in claim 8 wherein the control circuit further comprises a comparison device having a first input coupled to a point of reference voltage, a second input coupled to the control circuit input means to receive said voltage determined by the output voltage and an output coupled to a second input of the pulse-width modulator to supply thereto a DC voltage that varies as a function of said output voltage thereby to control the duration of the switching pulses.

10. A power supply as claimed in claim 9 wherein the voltage-controlled oscillator comprises a sawtooth generator whose output frequency determines the frequency of the switching pulses produced by the pulse-width modulator and the delay network includes means for producing a control voltage that is equal to the average value of the switching pulses at the control circuit output terminal.

11. A power supply as claimed in claim 7 wherein the delay network comprises a resistor and a capacitor connected in series circuit to the control circuit output terminal and said control circuit further comprises a voltage-controlled sawtooth oscillator having a frequency control input coupled to the capacitor of the delay network via the control circuit input means and an output coupled to an input of the pulse-width modulator to control the frequency of the switching pulses.

12. A power supply as claimed in claim 11 further comprising a second resistor and a second capacitor coupling said frequency control input of the sawtooth oscillator to said capacitor of the delay network.

13. A power supply as claimed in claim 11 wherein the delay network has an RC time constant such that the capacitor thereof develops a control voltage that is equal to the average value of the switching pulses at the control circuit output terminal.

14. A power supply as claimed in claim 7 wherein the inductor and tuning capacitor are connected in series circuit to the input terminal, the controlled switch comprises a transistor with its emitter-collector circuit connected across the tuning capacitor, and further comprising a diode connected in parallel with the transistor and polarized opposite thereto.

* * * * *